United States Patent
Zheng et al.

(10) Patent No.: US 11,916,738 B2
(45) Date of Patent: Feb. 27, 2024

(54) SERVICE PROCESSING METHOD AND NETWORK DEVICE

(71) Applicant: HUAWEI TECHNOLOGIES CO., LTD., Guangdong (CN)

(72) Inventors: Juan Zheng, Nanjing (CN); Xubao Zhang, Dongguan (CN); Junjie Huang, Dongguan (CN); Bo Wu, Nanjing (CN); Ting Liao, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/156,902

(22) Filed: Jan. 19, 2023

(65) Prior Publication Data

US 2023/0155890 A1 May 18, 2023

Related U.S. Application Data

(63) Continuation of application No. PCT/CN2021/107032, filed on Jul. 19, 2021.

(30) Foreign Application Priority Data

Jul. 23, 2020 (CN) .......... 202010720411.3

(51) Int. Cl.
*H04L 41/084* (2022.01)
*H04L 41/0806* (2022.01)
(Continued)

(52) U.S. Cl.
CPC ........ *H04L 41/084* (2013.01); *H04L 41/0806* (2013.01); *H04L 41/0893* (2013.01); *H04L 41/0895* (2022.05)

(58) Field of Classification Search
CPC ......... H04L 41/08; H04L 41/084–0846; H04L 41/0895; H04L 41/342; H04L 41/40
See application file for complete search history.

(56) References Cited

U.S. PATENT DOCUMENTS

| 10,708,368 | B1 * | 7/2020 | Young | H04L 67/52 |
| 10,958,525 | B2 * | 3/2021 | Fang | H04L 41/5051 |

(Continued)

FOREIGN PATENT DOCUMENTS

| CN | 105589506 A | 5/2016 |
| CN | 109525409 A | 3/2019 |

(Continued)

OTHER PUBLICATIONS

3GPP TR 28.801 V15.1.0, "3rd Generation Partnership Project; Technical Specification Group Services and System Aspects; Telecommunication management; Study on management and orchestration of network slicing for next generation network (Release 15)," Jan. 2018, 75 pages.

(Continued)

*Primary Examiner* — Brendan Y Higa

(74) *Attorney, Agent, or Firm* — Fish & Richardson P.C.

(57) ABSTRACT

Example service processing methods and apparatus are described. One example method includes obtaining a service template set by a first controller. The service template set includes one or more service templates. The first controller sends service template information corresponding to the service template set to a second controller. The first controller receives a first message sent by the second controller. The first message includes first service template information corresponding to a first service template, and the first service template information is determined by the second controller according to a requirement of a first service. The first controller performs provisioning of the first service based on the first service template that is determined based on the first (Continued)

service template information. The second controller determines a corresponding service template according to a service requirement, to trigger the first controller to perform service provisioning based on the service template.

20 Claims, 5 Drawing Sheets

(51) Int. Cl.
*H04L 41/0893* (2022.01)
*H04L 41/0895* (2022.01)

(56) References Cited

U.S. PATENT DOCUMENTS

| | | | | |
|---|---|---|---|---|
| 11,051,183 | B2* | 6/2021 | Senarath | H04L 41/044 |
| 11,115,920 | B1* | 9/2021 | Seetharaman | H04W 36/14 |
| 11,678,259 | B2* | 6/2023 | Lou | H04W 74/0833 370/329 |
| 2018/0317134 | A1* | 11/2018 | Leroux | H04L 61/5038 |
| 2018/0332485 | A1* | 11/2018 | Senarath | H04L 41/044 |
| 2019/0260690 | A1* | 8/2019 | Sun | H04L 47/2425 |
| 2020/0228405 | A1* | 7/2020 | Fang | H04L 41/0843 |
| 2020/0229080 | A1* | 7/2020 | Xu | H04W 48/18 |
| 2020/0287801 | A1* | 9/2020 | Xu | H04L 41/0886 |
| 2021/0075678 | A1* | 3/2021 | Seetharaman | H04L 41/0843 |
| 2022/0353138 | A1* | 11/2022 | Wyszkowski | H04L 41/5045 |
| 2022/0353151 | A1* | 11/2022 | Yu | H04W 24/02 |
| 2023/0038522 | A1* | 2/2023 | Sim | H04L 41/5003 |
| 2023/0040700 | A1* | 2/2023 | Karapantelakis | H04L 41/5067 |

FOREIGN PATENT DOCUMENTS

| | | |
|---|---|---|
| CN | 109560952 A | 4/2019 |
| CN | 109756357 A | 5/2019 |
| WO | 2018196793 A1 | 11/2018 |

OTHER PUBLICATIONS

Huawei et al., "pCR 28.531 Add definition and general information for network slice template," 3GPP TSG SA WG5 (Telecom Management) Meeting #119, S5-183413, La Jolla, CA, USA, May 14-18, 2018, 4 pages.
3GPP TS 23.501 V16.5.0, "3rd Generation Partnership Project; Technical Specification Group Services and System Aspects; System architecture for the 5G System (5GS); Stage 2 (Release 16)," Jul. 2020, 441 pages.
International Search Report and Written Opinion in International Appln. No. PCT/CN2021/107032, dated Sep. 28, 2021, 13 pages (with English translation).
3GPP TS 28.531 V16.2.0, "3rd Generation Partnership Project; Technical Specification Group Services and System Aspects; Management and orchestration; Provisioning; (Release 16)," Jun. 2019, 65 pages.
Extended European Search Report in European Appln No. 21846583.9, dated Dec. 11, 2023, 11 pages.

* cited by examiner

SERVICE PROCESSING METHOD AND NETWORK DEVICE

CROSS-REFERENCE TO RELATED APPLICATIONS

This application is a continuation of International Application No. PCT/CN2021/107032, filed on Jul. 19, 2021, which claims priority to Chinese Patent Application No. 202010720411.3, filed on Jul. 23, 2020. The disclosures of the aforementioned applications are hereby incorporated by reference in their entireties.

TECHNICAL FIELD

This application relates to the field of communications technologies, and in particular, to a service processing method and a network device.

BACKGROUND

As a fifth generation mobile communications (5G) network standard is formulated, a network slicing technology proposed based on a 5G network is continuously researched and developed. Network slicing means dividing a physical network of an operator into a plurality of virtual networks. The virtual networks can be divided according to different service requirements (for example, according to a latency requirement, a broadband size requirement, and a security requirement in an actual situation) to flexibly adapt to different network application scenarios, and are widely applied in industry applications.

Currently, a process in which an operator performs service provisioning is as follows: A controller in each subnet (for example, a wireless network, a bearer network, or a core network) obtains a service requirement of a user, calculates, based on a topology resource of the current subnet, a network resource that meets the service requirement of the user, and then performs service provisioning based on a calculation result.

Because the controller in the current subnet can perform service provisioning only based on a coarse-grained resource situation, it is difficult to ensure accuracy of service provisioning. In addition, because the current service provisioning is performed independently by the controller in the subnet, resource coordination cannot be performed based on the network resource, and it is difficult to ensure end-to-end service provisioning and proper resource utilization.

SUMMARY

This application provides a service processing method and a network device. A first controller sends information corresponding to a service template set to a second controller, so that the second controller can determine a corresponding service template according to a service requirement, and return the corresponding service template to the first controller, to ensure that the first controller can perform service provisioning based on the service template. The second controller determines the corresponding service template according to the service requirement, to trigger the first controller to perform service provisioning based on the service template. This can fully coordinate a network resource, meet a requirement of an end-to-end network service in an entire network or a network domain, and effectively use the network resource. In addition, in the method, service provisioning is allowed to be performed based on a resource status of a finer granularity, and multi-dimensional factors such as service performance assurance and service quality assurance are comprehensively considered, so that accuracy of service provisioning is improved.

A first aspect of this application provides a service processing method, including: a first controller obtains a service template set. The service template set includes one or more service templates, and the one or more service templates are separately used to determine one or more network slices. The first controller sends service template information corresponding to the service template set to a second controller. The service template information may include a service template identifier, attribute information, or description information corresponding to each service template in the service template set. The first controller receives a first message sent by the second controller. The first message includes first service template information corresponding to a first service template, the first service template belongs to the service template set, and the first service template information is determined by the second controller according to a requirement of a first service. The first controller performs provisioning of the first service based on the first service template. The first service template is determined based on the first service template information.

In this solution, the first controller sends the information corresponding to the service template set to the second controller, so that the second controller can determine a corresponding service template according to a service requirement, and return the corresponding service template to the first controller, to ensure that the first controller can perform service provisioning based on the service template. The second controller determines the corresponding service template according to the service requirement, to trigger the first controller to perform service provisioning based on the service template. This can coordinate a network resource, meet a requirement of an end-to-end network service in an entire network or a network domain, and effectively use the network resource. In addition, this also facilitates implementing precise service provisioning by coordinating and managing a network slice resource of a finer granularity.

Optionally, in a possible implementation, the one or more service templates separately correspond to one or more network slice identifiers, the one or more network slice identifiers are identifiers of one or more created network slices, and that the first controller performs provisioning of the first service based on the first service template includes: the first controller determines a first network slice based on the first service template. The first network slice is used to perform provisioning of the first service. In other words, when a network slice is created in advance, a correspondence may be established between a service template and the network slice, so that each service template has one or more corresponding network slice identifiers. In this way, the first controller may determine, based on the determined first service template, that the first network slice corresponding to the first service template is a network slice used to perform provisioning of the first service. The network slice is created in advance and the correspondence between the network slice and the service template is established, so that after determining the service template, the first controller can perform service provisioning based on the network slice corresponding to the service template, to implement quick service provisioning.

Optionally, in a possible implementation, that the first controller determines a first network slice based on the first service template includes: The first controller determines the first service template based on the first service template information. For example, the first controller determines the first service template based on a service template identifier of the first service template. The first controller determines the first network slice based on a first network slice identifier corresponding to the first service template.

Optionally, in a possible implementation, after the first controller determines the first network slice based on the first service template determined based on the first service template information, the method further includes: The first controller sends a second message to a forwarder based on the first service template. The second message is used to indicate the forwarder to perform configuration corresponding to the first service on the first network slice. In other words, after the first controller determines the first service template based on the first service template information sent by the second controller, the first controller needs to perform corresponding configuration on the determined network slice, to configure a local forwarding environment, to meet the requirement of the first service.

Optionally, in a possible implementation, that the first controller performs provisioning of the first service based on the first service template includes: The first controller sends a third message to the forwarder based on the first service template. The third message is used to indicate the forwarder to create the first network slice, and the first network slice created by the forwarder is used to perform provisioning of the first service. Briefly, when no network slice is created in advance, the first controller may determine the first service template based on the first service template information. The first controller indicates, based on the first service template, the forwarder to create the first network slice used to perform provisioning of the first service. The first network slice can meet the service requirement.

Optionally, in a possible implementation, the method further includes: the first controller receives a fourth message sent by the second controller. The fourth message includes second service template information corresponding to a second service template, the second service template belongs to the service template set, and the second service template is determined by the second controller according to a requirement of a second service. The first controller determines the first network slice based on the second service template determined based on the second service template information. The first network slice is used to perform provisioning of the second service. In other words, when a same network slice may be used to perform provisioning of a plurality of different services, the first controller may indicate the forwarder to perform provisioning of the different services on the same network slice. Provisioning of the plurality of services is performed on the same network slice, so that utilization efficiency of the network slice can be improved, to effectively use a network resource.

Optionally, in a possible implementation, the method further includes: the first controller receives a fourth message sent by the second controller. The fourth message includes second service template information corresponding to a second service template, the second service template belongs to the service template set, and the second service template is determined by the second controller according to a requirement of a second service. The first controller determines a second network slice based on the second service template determined based on the second service template information. The first controller sends a fifth message based on the fact that a resource that can be provided by the second network slice does not meet the requirement of the second service. The fifth message is used to indicate that the second network slice is unavailable. In other words, after determining the second network slice indicated by the second controller, the first controller may calculate whether the resource that can be provided by the second network slice can meet the requirement of the second service, for example, calculate whether a bandwidth resource that can be provided by the second network slice can meet a bandwidth requirement of the second service. In a possible case, due to dynamic changes of a network environment and network resources, when the first controller performs network slice-based resource calculation based on the determined first service template, a case in which a current status of the network slice corresponding to the first service template cannot meet an actual service requirement may occur. In this case, the first controller may send an operation such as an alarm message or a service provisioning failure message to the second controller, to feed back, to the second controller, information indicating that the second network slice is unavailable, so that the second controller can reselect, according to the requirement of the second service, a new service template corresponding to a different network slice.

Optionally, in a possible implementation, the first service template includes performance information, and after the first controller performs provisioning of the first service based on the first service template, the method further includes: the first controller performs performance monitoring on the first service based on the performance information. For example, the first controller may automatically trigger performance monitoring on the first service based on the performance information in the first service template, or the second controller may enable the performance information in the first service template, to trigger the first controller to perform performance monitoring on the first service. For example, the performance information may include a performance detection protocol that can be specified, for example, a protocol used to support hop-by-hop or end-to-end performance detection, such as in-situ flow information telemetry (iFIT), a two-way active measurement protocol (TWAMP), or a Y.1731 protocol. In addition, configuration is allowed to be performed on an attribute (such as a detection time or a detection cycle) supported in the protocol.

Optionally, in a possible implementation, the first controller includes a network slice subnet management function (NSSMF), and the second controller includes a network slice management function (NSMF).

Optionally, in a possible implementation, the service template includes one or more of a virtual private network (VPN) access mode, bearer tunnel information, performance information, and service level agreement (SLA) information.

A second aspect of this application provides a service processing method, including: a second controller receives first service template information that is sent by a first controller and that corresponds to a first service template set. The first service template set includes one or more service templates, and the one or more service templates are separately used to determine one or more network slices. The second controller sends a first message to the first controller. The first message includes first service template information corresponding to a first service template, the first service template belongs to the service template set, and the first service template information is determined by the second controller according to a requirement of a first service. After receiving the service template information corresponding to the service template set, the second controller can determine, according to a specific service requirement of a user and received service template information and from the service template set, the first service template information (for example, a service template identifier) that can match the service requirement of the user. Therefore, after receiving the first service template information, the first controller can determine a corresponding first service template based on the first service template information, to calculate a network resource and perform service provisioning. This ensures precise provisioning of a fine-grained service, meets a requirement of an end-to-end network service in an entire network or a network domain, and effectively uses the network resource.

Optionally, in a possible implementation, the service template information includes one or more service template identifiers respectively corresponding to the one or more service templates, and the first message includes a first service template identifier corresponding to the first service template.

Optionally, in a possible implementation, before the second controller sends the first message to the first controller, the method includes: The second controller obtains network topology resource information. The second controller determines, according to the requirement of the first service and the network topology resource information, the first service template information corresponding to the first service template.

Optionally, in a possible implementation, before the second controller sends the first message to the first controller, the method further includes: The second controller receives third service template information that is sent by a third controller and that corresponds to a third service template. The second controller determines, based on the first service template information received from the first controller and the third service template information received from the third controller, the first service template information corresponding to the first service template. The second controller may be used as a super controller to receive information that is of the service template set and that is fed back by a plurality of controllers responsible for different network segments in a management domain range, to determine, by integrating resource information, network topology structures, and the like of the different network segments, a plurality of pieces of service template information that meet the service requirement. In addition, the second controller returns the plurality of pieces of service template information to the corresponding plurality of controllers. In this way, an entire network resource in the management domain is coordinated, to implement precise service provisioning.

Optionally, in a possible implementation, the first controller includes an NSSMF, and the second controller includes an NSMF.

A third aspect of this application provides a network device. The network device is a first controller, and the network device includes an obtaining unit, a transceiver unit, and a processing unit. The obtaining unit is configured to obtain a service template set. The service template set includes one or more service templates, and the one or more service templates are separately used to determine one or more network slices. The transceiver unit is configured to send service template information corresponding to the service template set. The transceiver unit is further configured to receive a first message sent by a second controller. The first message includes first service template information corresponding to a first service template, the first service template belongs to the service template set, and the first service template information is determined by the second controller according to a requirement of a first service. The processing unit is configured to perform, by the first controller, provisioning of the first service based on the first service template. The first service template is determined based on the first service template information.

Optionally, in a possible implementation, the one or more service templates separately correspond to one or more network slice identifiers, and the one or more network slice identifiers are identifiers of one or more created network slices. The processing unit is further configured to determine a first network slice based on the first service template. The first network slice is used to perform provisioning of the first service.

Optionally, in a possible implementation, the processing unit is further configured to: determine the first service template based on the first service template information, and determine the first network slice based on a first network slice identifier corresponding to the first service template.

Optionally, in a possible implementation, the transceiver unit is further configured to send a second message to a forwarder based on the first service template. The second message is used to indicate the forwarder to perform configuration corresponding to the first service on the first network slice.

Optionally, in a possible implementation, the transceiver unit is further configured to send a third message to the forwarder based on the first service template. The third message is used to indicate the forwarder to create the first network slice, and the first network slice created by the forwarder is used to perform provisioning of the first service.

Optionally, in a possible implementation, the method further includes: The transceiver unit is further configured to receive a fourth message sent by the second controller. The fourth message includes second service template information corresponding to a second service template, the second service template belongs to the service template set, and the second service template is determined by the second controller according to a requirement of a second service. The processing unit is further configured to determine the first network slice based on the second service template determined based on the second service template information. The first network slice is used to perform provisioning of the second service.

Optionally, in a possible implementation, the transceiver unit is further configured to receive a fourth message sent by the second controller. The fourth message includes second service template information corresponding to a second service template, and the second service template belongs to the service template set, and the second service template is determined by the second controller according to a requirement of a second service. The processing unit is further configured to determine a second network slice based on the second service template determined based on the second service template information. The transceiver unit is further configured to send a fifth message based on the fact that a source that can be provided by the second network slice does not meet the requirement of the second service. The fifth message is used to indicate that the second network slice is unavailable.

Optionally, in a possible implementation, the first service template includes performance information, and the processing unit is further configured to perform performance monitoring on the first service based on the performance information.

Optionally, in a possible implementation, the first controller includes an NSSMF, and the second controller includes an NSMF.

Optionally, in a possible implementation, the service template includes one or more of a virtual private network VPN access mode, bearer tunnel information, performance information, and service level agreement SLA information.

A fourth aspect of this application provides a network device. The network device is a second controller, and the network device includes a transceiver unit. The transceiver unit is configured to receive first service template information that is sent by a first controller and that corresponds to a first service template set. The first service template set includes one or more service templates, and the one or more service templates are separately used to determine one or more network slices. The transceiver unit is further configured to send a first message to the first controller. The first message includes first service template information corresponding to a first service template, the first service template belongs to the service template set, and the first service template information is determined by the second controller according to a requirement of a first service.

Optionally, in a possible implementation, the service template information includes one or more service template identifiers respectively corresponding to the one or more service templates, and the first message includes a first service template identifier corresponding to the first service template.

Optionally, in a possible implementation, the network device further includes an obtaining unit and a processing unit. The obtaining unit is configured to obtain network topology resource information. The processing unit is configured to determine, according to the requirement of the first service and the network topology resource information, the first service template information corresponding to the first service template.

Optionally, in a possible implementation, the transceiver unit is further configured to receive third service template information that is sent by a third controller and that corresponds to a third service template.

The processing unit is further configured to determine, based on the first service template information received from the first controller and the third service template information received from the third controller, the first service template information corresponding to the first service template.

A fifth aspect of this application provides a network device. The network device may be a first controller. The network device includes a processor and a memory. The memory is configured to store instructions, and the processor is configured to execute the instructions in the memory, so that the network device is enabled to perform the method according to any one of the first aspect or the second aspect.

A sixth aspect of this application provides a network device. The network device may be a second controller. The network device includes a processor. The processor is coupled to a memory, and the processor is configured to execute instructions in the memory, so that the network device is enabled to perform the method according to any one of the first aspect or the second aspect.

A seventh aspect of this application provides a computer storage medium. The computer storage medium may be nonvolatile. The computer storage medium stores computer-readable instructions, and when the computer-readable instructions are executed by a processor, the method according to any one of the first aspect or the second aspect is implemented.

An eighth aspect of this application provides a computer program product including instructions. When the computer program product runs on a computer, the computer is enabled to perform the method according to any one of the first aspect or the second aspect.

A ninth aspect of this application provides a network system. The network system includes the network device according to any implementation of the third aspect and the network device according to any implementation of the fourth aspect.

Optionally, in a possible implementation, the network system may include a plurality of first controllers according to any implementation of the third aspect. The network system may further include one or more forwarders, and the one or more forwarders may be configured to receive service configuration information sent by the first controller.

It can be learned from the foregoing technical solutions that this application has the following advantages.

This application provides a service processing method and a network device. The first controller sends the information corresponding to the service template set to the second controller, so that the second controller can determine the corresponding service template according to the service requirement, and return the corresponding service template to the first controller, to ensure that the first controller can perform service provisioning based on the service template. The second controller determines the corresponding service template based on the network topology resource and the service requirement, to trigger the first controller to perform service provisioning based on the service template. The method can fully coordinate a network resource, meet a requirement of an end-to-end network service in an entire network or a network domain, and effectively use the network resource. In addition, in the method, service provisioning is allowed to be performed based on a resource status of a finer granularity, and multi-dimensional factors such as service performance assurance and service quality assurance are comprehensively considered, so that accuracy of service provisioning is improved.

DESCRIPTION OF EMBODIMENTS

Figure 1:
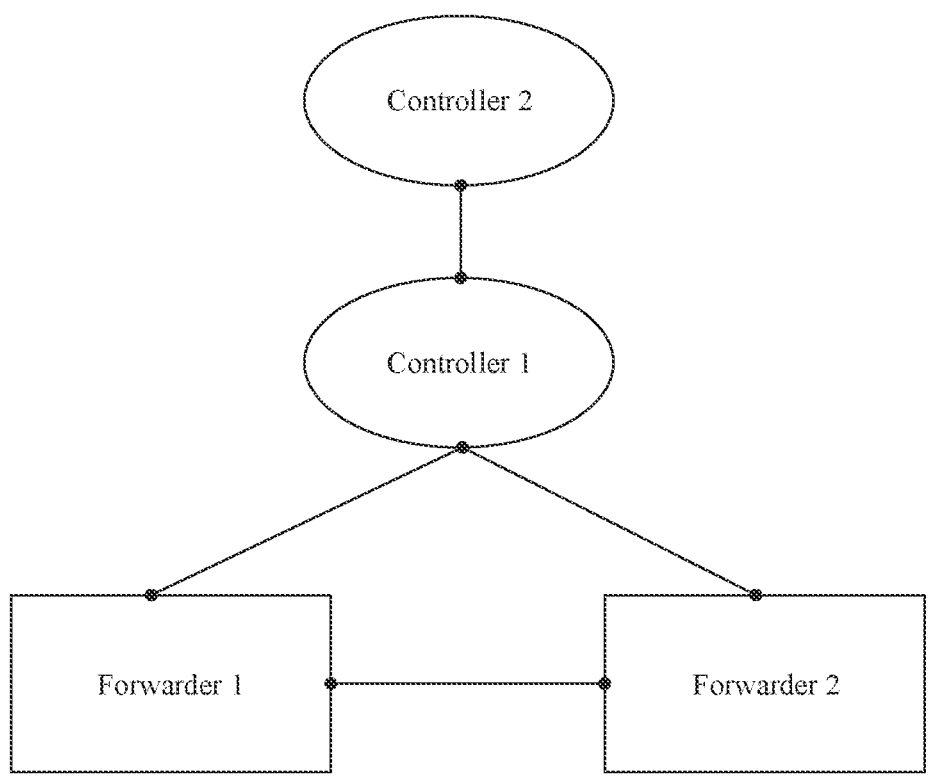
FIG. 1 is a schematic diagram of an application architecture of a service processing method according to an embodiment of this application.

To make objectives, technical solutions, and advantages of this application clearer, the following describes embodiments of this application with reference to the accompanying drawings. It is clear that the described embodiments are merely some but not all of embodiments of this application. A person of ordinary skill in the art may learn that, as a new application scenario emerges, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, so that embodiments described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Unit division in this application is logical division and may be other division during actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in this application. In addition, units or subunits described as separate parts may or may not be physically separate, may or may not be physical units, or may be distributed into a plurality of circuit units. Some or all of the units may be selected according to actual requirements to achieve the objectives of the solutions of this application.

In a 5G network, diversified service requirements have different demands on the network in terms of speed, performance, security, reliability, and latency. For example, an enhanced mobile broadband (eMBB) scenario (for example, a virtual reality scenario or an augmented reality scenario) has a relatively high requirement for bandwidth, and requires xGbps-level bandwidth. For another example, in a massive machine type communications (, mMTC) scenario (for example, a wearable scenario or a smart grid scenario), access of a large quantity of devices needs to be supported, for example, access of hundreds of millions or billions of devices needs to be supported. For another example, an ultra-reliable and low latency communication (uRLLC) scenario (for example, a self-driving scenario, a remote surgery scenario, or an industrial control scenario) needs to support ultra-low latency of 1 ms. A network slice emerges to meet different scenarios, different requirements, and a superior experience requirement by flexibly constructing a network with different features based on different scenarios and requirements.

The network slice is a logical network customized according to different service requirements on a physical or virtual network infrastructure. The network slice may be a complete end-to-end network including an access network, a transport network, a core network, and an application server, can provide a complete communication service, and has a specific network capability. Alternatively, the network slice may be any combination of an access network, a transport network, a core network, and an application server.

One network slice may be usually considered as an instantiated 5G network. In such a network structure, an operator can provide a network for a user as a service, and can freely combine physical networks based on indicators such as a rate, a capacity, coverage, latency, reliability, security, and availability, to meet requirements of different users.

Currently, a process in which an operator performs service provisioning is as follows: a controller in each subnet (for example, a wireless network, a bearer network, or a core network) obtains a service requirement of a user, calculates, based on a topology resource of the current subnet, a network resource that meets the service requirement of the user, and then performs service provisioning based on a calculation result.

The controller in the current subnet can perform service provisioning only based on a coarse-grained resource situation. As a result, it is difficult to ensure accuracy of service provisioning. In addition, the current service provisioning is performed independently by the controller in the subnet, and resource coordination cannot be performed based on the network resource. Therefore, it is difficult to ensure end-to-end service provisioning and proper resource utilization.

In view of this, embodiments of this application provide a service processing method. A first controller sends information corresponding to a service template set to a second controller, so that the second controller can determine a corresponding service template according to a service requirement, and return the corresponding service template to the first controller, to ensure that the first controller can perform service provisioning based on the service template. The second controller determines the corresponding service template according to the service requirement, to trigger the first controller to perform service provisioning based on the service template. The method can fully coordinate a network resource, meet a requirement of an end-to-end network service in an entire network or a network domain, and implement effective utilization of the network resource. In addition, in the method, service provisioning is allowed to be performed based on a resource status of a finer granularity, and multi-dimensional factors such as service performance assurance and service quality assurance are comprehensively considered, so that accuracy of service provisioning is improved.

Refer to FIG. 1. FIG. 1 is a schematic diagram of an application architecture of a service processing method according to an embodiment of this application. As shown in FIG. 1, the application architecture includes a controller 1, a controller 2, a forwarder 1, and a forwarder 2. The first controller is connected to the second controller, and the first controller is further connected to the forwarder 1 and the forwarder 2. The controller 1 may obtain a service template set, and send the service template set to the controller 2. After determining a service template according to a service requirement, the controller 2 sends the determined service template to the controller 1, so that the controller 1 performs service provisioning based on the service template.

It may be understood that the controller 1 may be a network device having a centralized management function in a subnet, and can manage a forwarder, for example, may be a network slice subnet management function (NSSMF) defined in a 3rd generation partnership project (3GPP) TR28.801 standard. The controller 2 may be an upper-layer controller of a controller in each subnet, and can manage controllers in a plurality of subnets, for example, may be a network slice management function (NSMF) defined in the 3GPP TR28.801 standard. The forwarder 1 and the forwarder 2 may be physical devices that can implement traffic forwarding, such as switches, routers, or gateways, or may be virtual devices that support traffic forwarding.

Figure 2:
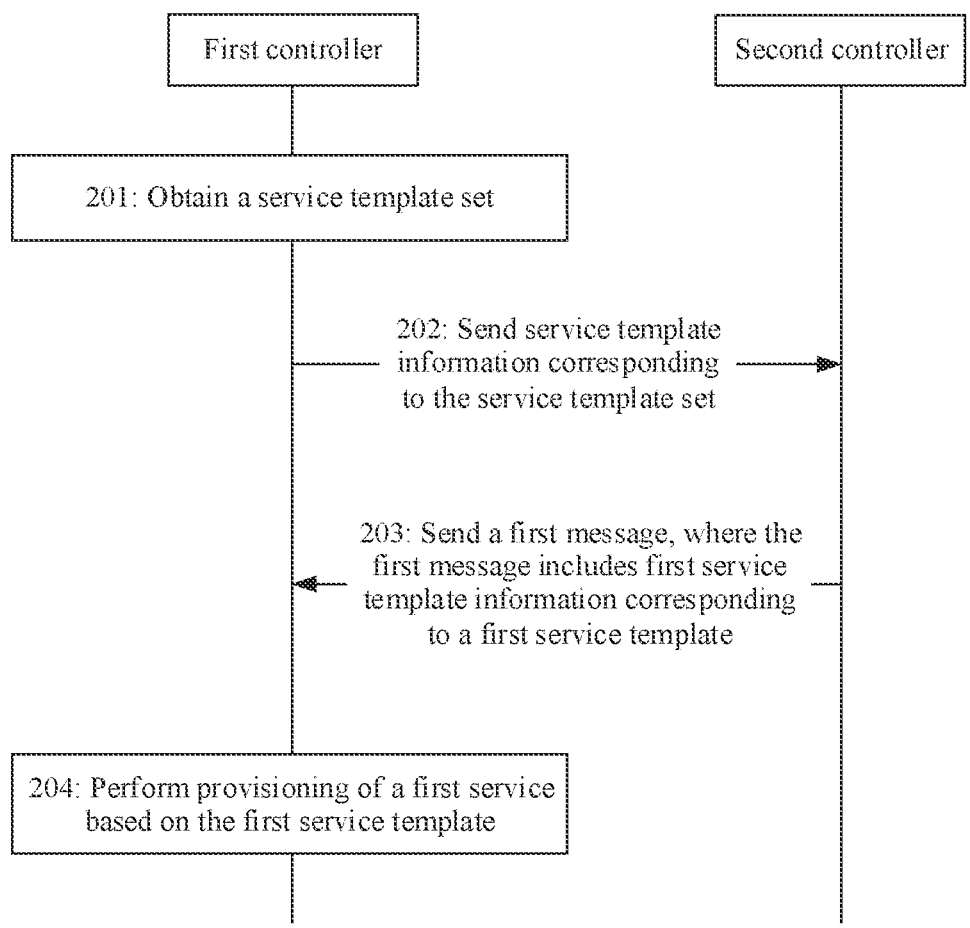
FIG. 2 is a schematic flowchart of a service processing method 200 according to an embodiment of this application.

Refer to FIG. 2. FIG. 2 is a schematic flowchart of a service processing method 200 according to an embodiment of this application. As shown in FIG. 2, the service processing method 200 provided in this embodiment of this application includes the following steps.

Step 201: A first controller obtains a service template set. The service template set includes one or more service templates, and the one or more service templates are separately used to determine one or more network slices.

In this embodiment, the service template may be generated or obtained in advance by a first network device. The service template may include attribute information of a network, and can be used to match a service requirement of a user.

The first controller may be a network device having a centralized management function in a subnet, and can manage a forwarder, for example, may be a network slice subnet management function (NSSMF) in a bearer network.

For example, the service template may include one or more of a VPN access mode, tunnel information, performance information, and service level agreement (SLA) information.

The VPN access mode may include a layer 2 (L2) VPN access mode or a layer 3 (L3) VPN access mode.

The tunnel information may be used to indicate a tunnel carrying traffic, and the tunnel information may specifically include a multi-protocol label switching (MPLS) tunnel, an LDP tunnel, an LSP tunnel/MPLS tunnel, or an LSP tunnel based on traffic engineering (TE)/a segment routing (Segment Routing Internet protocol version 6, SR) SR MPLS tunnel/a segment routing over internet protocol version 6 (SRv6) tunnel.

The performance information may include a performance detection protocol that needs to be executed by the forwarder. The performance detection protocol may include, for example, a protocol used to detect hop-by-hop or end-to-end performance information, such as in-situ flow information telemetry (iFIT), a two-way active measurement protocol (TWAMP), or Y.1731. Optionally, the performance information further includes detection time information, for example, time information such as a detection time and a detection cycle that are specified.

The SLA information may include capability information of a network slice used to carry traffic. For example, the SLA information may include at least one piece of the following information: latency, bandwidth, a coverage level, a coverage area, mobility, a user number, user distribution, a capacity, a throughput rate, reliability information, a transmission model, location information, and a success ratio.

Optionally, the SLA information may further include a level of each piece of capability information in the SLA information, for example, a level of the latency or the bandwidth. The level of the capability information in the SLA may include, for example, a gold level, a silver level, or a bronze level. A higher level of the capability information indicates better performance corresponding to the capability information. For example, latency of a gold level may mean that latency of a network slice is within 5 milliseconds, latency of a silver level may mean that latency of a network slice is within 50 milliseconds, and latency of a bronze level may mean that latency of a network slice is within 100 milliseconds.

Step 202: The first controller sends service template information corresponding to the service template set to a second controller.

In this embodiment, after obtaining the service template set, the first controller may send the service template information corresponding to the service template set to the second controller. Alternatively, after the second controller requests to query the service template information, the first controller may send the service template information corresponding to the service template set to the second controller. The second controller may be an upper-layer controller of a controller in each subnet, and can manage controllers in a plurality of subnets, for example, may be an NSMF. The service template information is used to describe the service template set. A form of the service template information may be an entire table used to describe the service template set, and different entries in the entire table are respectively used to describe different templates in the service template set. Alternatively, the service template information may be in a form of a set of a plurality of tables. Each of the plurality of tables is used to describe each service template in the service template set.

In a possible embodiment, the service template information corresponding to the service template set may include attribute information of each service template in the service template set, or the service template information may include description information corresponding to each service template in the service template set.

For example, the first controller may generate a unique service template identifier for each service template in the service template set in advance, to identify different service templates. In a process in which the first controller sends the service template information, the first controller may send the service template identifier corresponding to each service template in the service template set and attribute information included in the service template, so that the second controller can obtain the service template identifier and the attribute information corresponding to the service template identifier in the service template.

For example, the first controller may alternatively generate a unique service template identifier and corresponding description information for each service template in the service template set in advance. The description information corresponding to each service template is used to briefly describe core attribute information of the service template or a function of the service template. For example, description information corresponding to a service template 1 may be that latency of the service template 1 is a gold level, description information corresponding to a service template 2 may be that the service template 2 is used for a banking service, and description information corresponding to a service template 3 may be that the service template 3 is used for a government service. Therefore, in the process in which the first controller sends the service template information, the first controller may alternatively send the service template identifier corresponding to each service template in the service template set and the description information corresponding to the service template, so that the second controller can obtain the service template identifier and the description information of the service template corresponding to the service template identifier.

Step 203: The second controller sends a first message to the first controller, where the first message includes first service template information corresponding to a first service template, the first service template belongs to the service template set, and the first service template information is determined by the second controller according to a requirement of a first service.

In this embodiment, the first service template information sent by the second controller is used by the first controller to determine the corresponding first service template. In other words, the first controller may determine, based on the first service template information, the first service template corresponding to the first service template. The first service template information may include one or more of a service template identifier corresponding to the first service template, attribute information included in the first service template, or description information corresponding to the first service template.

In a possible embodiment, the second controller may determine the first service template information according to the requirement of the first service. The requirement of the first service is a service requirement initiated by the user, and the second controller may obtain the requirement of the first service.

For example, when the user is a bank, the requirement of the first service initiated by the user may be establishing a communication connection between a bank head office and a bank branch in two places. In this way, the second controller may determine, according to the requirement of the first service, the first service template used for a banking service as a service template for performing provisioning of the first service. Therefore, the second controller may send the service template information corresponding to the first service template to the first controller.

For another example, when the requirement of the first service specifically includes that latency is within 10 milliseconds and a VPN access mode is an L2 VPN access mode, the second controller may match, according to the requirement of the first service, a first service template whose latency level is gold and whose VPN access mode is the L2 VPN access mode. Therefore, the service template information corresponding to the first service template is sent to the first controller.

In another possible embodiment, the second controller may obtain network topology resource information and other network structure information or device information. The second controller determines, based on type information such as the requirement of the first service and the network topology resource information, the first service template information corresponding to the first service template. For example, the network topology resource information may be topology resource information of a subnet in which the first controller is located, for example, may include topology resource information such as topology information in an entire network or a subnet or topology information of some key nodes in a network. The second controller may further obtain other network structure information and device information, for example, board information and port information of a network element (that is, a network node). In this way, the second controller may use obtained information such as a node location, an idle board, a port, and/or a slot as known capability information of the current network, and further determine, based on the capability information of the current network and the service requirement, a service template that can be matched the current network.

In a possible embodiment, the second controller may further have a specific service template customization capability. For example, the second controller may be allowed to supplement, according to the service requirement proposed by the user, some attribute requirements related to the first service template in the first service template information sent to the first controller, to notify the first controller of further considering the supplemented attribute requirement based on the first service template, and calculate whether a network slice corresponding to the first service template can still meet the service requirement and perform service provisioning.

In another possible embodiment, the second controller may receive third service template information that is sent by a third controller and that corresponds to a third service template. The second controller determines, based on the first service template information received from the first controller and the third service template information received from the third controller, the first service template information corresponding to the first service template. The third controller and the first controller are, for example, separately located in different subnets, and are configured to manage forwarders in the different subnets. For example, the first controller may be a controller in a bearer network, and the third controller may be a controller in a core network. That is, the second controller determines, based on service template information obtained from different controllers, the first service template information sent to the first controller.

The first controller and the third controller each may obtain or generate a corresponding service template set, and send service template information corresponding to the service template set to the second controller. The third service template information corresponding to a third service is information in the service template information that is sent by the third controller and that corresponds to the service template set. In a possible case, content and/or forms included in service templates generated by the first controller and the third controller may be the same, or may be different. Content and/or forms of the service template information that corresponds to the service template set and that is sent by the first controller and the third controller to the second controller may also be the same or different.

For the second controller, after the second controller obtains the requirement of the first service, the second controller needs to determine a service template that is in each subnet and that corresponds to the requirement of the first service, so that a controller in each subnet can perform provisioning of the first service based on the corresponding service template. The second controller may comprehensively consider service template information sent by different controllers, to determine service template information sent to each controller, that is, determine a service template used by each controller to execute the first service. A service template for performing service provisioning is determined by integrating service template information sent by controllers in different subnets. This can effectively coordinate a resource in an entire network, and effectively use the network resourced. During actual application, there may be any plurality of subnet controllers that can interact with each other within a management domain range of the second controller. Different subnet controllers may be configured to manage different network domains, such as a bearer network and a core network, but may also be configured to manage a same network domain. For example, a bearer network includes two subnet controllers, which are respectively configured to manage different network devices in the bearer network.

Step 204: The first controller performs provisioning of the first service based on the first service template, where the first service template is determined based on the first service template information.

In this embodiment, there are a plurality of manners in which the first controller performs provisioning of the first service based on the first service template.

In a possible embodiment, when a network slice is created in advance, the first controller may determine the first service template based on the received first service template information. The first controller determines the first network slice based on the first network slice identifier corresponding to the first service template. The first network slice is used to perform provisioning of the first service.

In another possible embodiment, when no network slice is created in advance, the first controller may determine the first service template based on the first service template information. The first controller indicates, based on the first service template, the forwarder to create a first network slice used to perform provisioning of the first service.

For example, the first controller may send a third message to the forwarder based on the first service template. The third message is used to indicate the forwarder to create the first network slice, and the first network slice created by the forwarder is used to perform provisioning of the first service.

After the first controller determines the first network slice used to perform provisioning of the first service, the first controller may send a second message to the forwarder based on the first service template. The second message is used to indicate the forwarder to perform configuration corresponding to the first service on the first network slice.

It may be understood that after the first controller determines the first service template based on the first service template information sent by the second controller, the first controller needs to perform corresponding configuration on the determined network slice, to configure a local forwarding environment, to meet the requirement of the first service.

For example, when attributes included in the first service template include an L2 VPN access mode and an MPLS tunnel, the first controller may send the second message based on the first service template. The second message is used to indicate the forwarder to create the L2 VPN and the MPLS tunnel on the first network slice. For example, the second message may alternatively be used by the forwarder to configure a corresponding access point (endpoint), a corresponding access model, or the like on the first network slice. Configuration content indicated by the second message is not specifically limited in this embodiment.

In this embodiment, the first controller sends the information corresponding to the service template set to the second controller, so that the second controller can determine the corresponding service template according to the service requirement, and return the corresponding service template to the first controller, to ensure that the first controller can perform service provisioning based on the service template. The second controller determines the corresponding service template according to the service requirement. The method can fully coordinate a network resource, meet a requirement of an end-to-end network service in an entire network or a network domain, and effectively use the network resource. In addition, in the method, service provisioning is allowed to be performed based on a resource status of a finer granularity, and multidimensional factors such as service performance assurance and service quality assurance are comprehensively considered, so that accuracy of service provisioning is improved.

In a possible embodiment, a same network slice may be used to perform provisioning of a plurality of different services, that is, provisioning of the plurality of different services may be performed on the same network slice. In other words, when the same network slice may be used to perform provisioning of the plurality of different services, the first controller may indicate the forwarder to perform provisioning of the different services on the same network slice.

For example, the method 200 may further include: The first controller receives a fourth message sent by the second controller. The fourth message includes second service template information corresponding to a second service template, the second service template belongs to the service template set, and the second service template is determined by the second controller according to a requirement of a second service. The first controller determines the first network slice based on the second service template determined based on the second service template information. The first network slice is used to perform provisioning of the second service. In other words, when the second controller obtains the requirement of the second service, the second controller determines, according to the requirement of the second service, the second service template used to perform provisioning of the second service, and a network slice corresponding to the second service template is the first network slice. Therefore, the first controller may indicate the forwarder to perform provisioning of the first service and the second service on the first network slice.

In another possible embodiment, one network slice may alternatively be used to perform provisioning of only one service, that is, one service may exclusively use one network slice. In other words, when a network slice has been exclusively used by a service, the first controller may indicate the forwarder not to perform provisioning of another service on the exclusive network slice.

In a possible embodiment, after the first controller determines a network slice used to perform service provisioning, the first controller may perform calculation on a resource of the network slice, to determine whether the network slice can be used to perform service provisioning.

For example, the method 200 may further include: The first controller receives a fourth message sent by the second controller. The fourth message includes second service template information corresponding to a second service template, the second service template belongs to the service template set, and the second service template is determined by the second controller according to a requirement of a second service. The first controller determines a second network slice based on the second service template determined based on the second service template information. The first controller sends a fifth message based on the fact that a resource that can be provided by the second network slice does not meet the requirement of the second service. The fifth message is used to indicate that the second network slice is unavailable.

In other words, after determining the second network slice indicated by the second controller, the first controller may calculate whether the resource that can be provided by the second network slice can meet the requirement of the second service, for example, calculate whether a bandwidth resource that can be provided by the second network slice can meet a bandwidth requirement of the second service. When the second network slice cannot meet the requirement of the second service, the first controller may feed back, to the second controller, information indicating that the second network slice is unavailable, so that the second controller can reselect, according to the requirement of the second service, a new service template corresponding to a different network slice.

In a possible embodiment, when the first service template includes performance information, after the first controller performs provisioning of the first service based on the first service template, the method further includes: The first controller performs performance monitoring on the first service based on the performance information.

In a possible implementation, the first controller may automatically trigger performance monitoring on the first service based on the performance information in the first service template. For example, when the first service template includes iFIT, the first controller may indicate, based on the iFIT in the first service template, the forwarder to create an iFIT monitoring instance. In addition, in a running process in which the forwarder creates the iFIT monitoring instance, the first controller may receive, in real time, performance monitoring information reported by the iFIT monitoring instance, for example, information such as latency, jitter, or packet loss. Alternatively, the first controller may feed back, to the second controller in real time or periodically, the performance monitoring information received by the first controller.

In another possible implementation, the second controller may enable the performance information in the first service template, to trigger the first controller to perform performance monitoring on the first service. For example, the second controller may send a message to the first controller, to request the first controller to execute the performance information in the first service template, so that the first controller indicates the forwarder to create a corresponding monitoring instance. In a possible case, the first controller may further obtain end-to-end performance monitoring data based on performance monitoring information sent by one or more forwarders, and feed back the end-to-end performance monitoring data to the second controller.

The foregoing describes a process in which the first controller performs service provisioning. For ease of understanding, the following describes in detail, with reference to a specific example, a process in which the first controller performs service provisioning in a scenario in which a network slice is created in advance.

Figure 3:
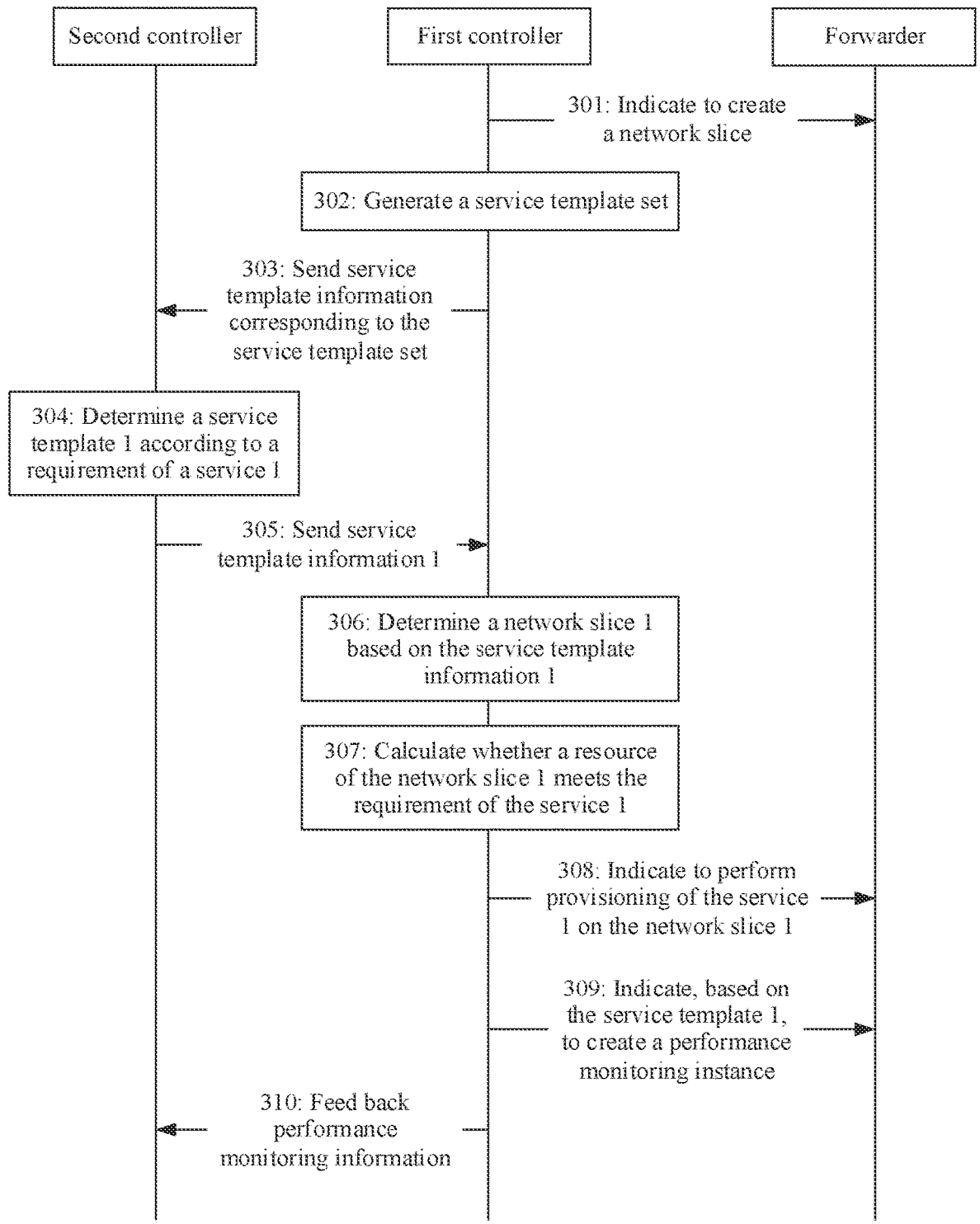
FIG. 3 is a schematic flowchart of a service processing method 300 according to an embodiment of this application.

Refer to FIG. 3. FIG. 3 is a schematic flowchart of a service processing method 300 according to an embodiment of this application. As shown in FIG. 3, the service processing method 300 includes the following steps.

Step 301: A first controller indicates a forwarder to create a network slice.

The first controller may indicate, by sending indication information to the forwarder, these network devices to create the network slice, to create the network slice in advance. In addition, the first controller may allocate different network slice identifiers (Slice ID) to different network slices, to identify the different network slices. In this way, the first controller may obtain a network slice identifier corresponding to each network slice.

For example, creation of a network slice may be implemented by using various different resource isolation technologies, including but not limited to a flexible Ethernet (FlexE) technology, a FlexE cross-connection technology, a channelized sub-interface technology, a hierarchical quality of service (HQoS) technology, a flexible Ethernet algorithm (Flex-Algo), a virtual private network (VPN) technology, and the like. Logical topology isolation of hardware or software is performed on a same physical network topology by using these resource isolation technologies, and an isolated network resource topology is a network slice. In addition, the first network device may identify different network resource topologies by allocating one network slice identifier to the isolated network resource topology.

It may be understood that, in addition to that the first controller indicates the forwarder to create the network slice, in another possible embodiment, the network slice may also be created by operation and maintenance personnel through manual configuration. For example, the operation and maintenance personnel configure, based on a topology and resource situation in an entire network or a network domain, some physical resources or logical resources in the network as a network slice, and allocate a corresponding network slice identifier to the network slice. In this way, the first controller may obtain, based on the forwarder on which the network slice is created, the network slice identifier corresponding to each network slice.

It may be understood that network slice may be created in advance based on different performance requirements, to implement proper utilization of a network resource. For example, in a plurality of network slices that are created in advance, different network slices have different network resources, to be applicable to different performance requirements. For example, a part of the network slices is applicable to a low latency requirement, and another part of the network slices is applicable to a high-bandwidth requirement. In addition, in the part of the network slices applicable to the low latency requirement, latency requirements applicable to different network slices may also be different. For example, some network slices are applicable to a latency requirement within 10 ms, and some other network slices are applicable to a latency requirement within 5 ms.

Step 302: The first controller generates a service template set.

The service template set includes one or more service templates, and the one or more service templates correspond to the one or more created network slices, that is, each service template has a correspondence with the one or more corresponding network slice identifiers.

In a possible implementation, after the first controller determines the one or more network slices corresponding to each service template, the first controller may establish a correspondence between the service template and the network slice, for example, establish a correspondence between a service template identifier and the network slice identifier, so that a corresponding network slice is determined based on the service template.

In another possible implementation, the service template may alternatively include the network slice identifier corresponding to the service template, and the first controller may determine, based on the network slice identifier included in the service template, the network slice corresponding to the service template.

For example, the service template may include one or more of the network slice identifier, a VPN access mode, tunnel information, performance information, and SLA information.

Step 303: The first controller sends service template information corresponding to the service template set to a second controller.

For example, the service template information may include one or more of a service template identifier, description information, or attribute information corresponding to each service template in the service template set.

Step 304: The second controller determines the service template 1 according to a requirement of a service 1.

The requirement of the service 1 is a service requirement initiated by a user. The second controller may determine, in the service template information according to the requirement of the service 1, the service template 1 that matches the requirement of the service 1. A network slice corresponding to the service template 1 may be used to perform provisioning of the service 1.

Step 305: The second controller sends service template information 1 to the first controller.

After the second controller determines the service template 1, the second controller may send the service template information 1 corresponding to the service template 1 to the first controller. The service template information 1 may be, for example, a network slice identifier or description information corresponding to the service template 1.

Step 306: The first controller determines a network slice 1 based on the service template information 1.

Step 307: The first controller calculates whether a resource of the network slice 1 meets the requirement of the service 1.

It may be understood that the resource in the network may continuously change, and services provisioned on the network slice 1 may also continuously increase. Therefore, to ensure that the network slice 1 used to perform provisioning of the service 1 can meet the requirement of the service 1, before performing provisioning of the service 1 based on the network slice 1, the first controller may calculate in advance whether the resource of the network slice 1 meets the requirement of the service 1.

Step 308: The first controller indicates the forwarder to perform provisioning of the service 1 on the network slice 1.

When the first controller learns, through calculation, that the resource on the network slice 1 can meet the requirement of the service 1, the first controller may indicate the forwarder to perform provisioning of the service 1 on the network slice 1.

Step 309: The first controller indicates, based on the service template 1, the forwarder to create a performance monitoring instance.

When the service template 1 includes a performance detection protocol, the first controller may trigger creation of the performance monitoring instance based on the performance detection protocol in the service template 1, that is, the first controller indicates the forwarder to create the performance monitoring instance corresponding to the performance detection protocol.

Step 310: The first controller feeds back performance monitoring information to the second controller.

In a running process in which the forwarder creates an iFIT monitoring instance, the first controller may receive, in real time, performance monitoring information reported by the iFIT monitoring instance, for example, information such as latency, jitter, or packet loss. Alternatively, the first controller may feed back, to the second controller in real time or periodically, the performance monitoring information received by the first controller.

The following describes in detail, with reference to a specific example, a process in which the first controller performs service provisioning in a scenario in which no network slice is created.

Figure 4:
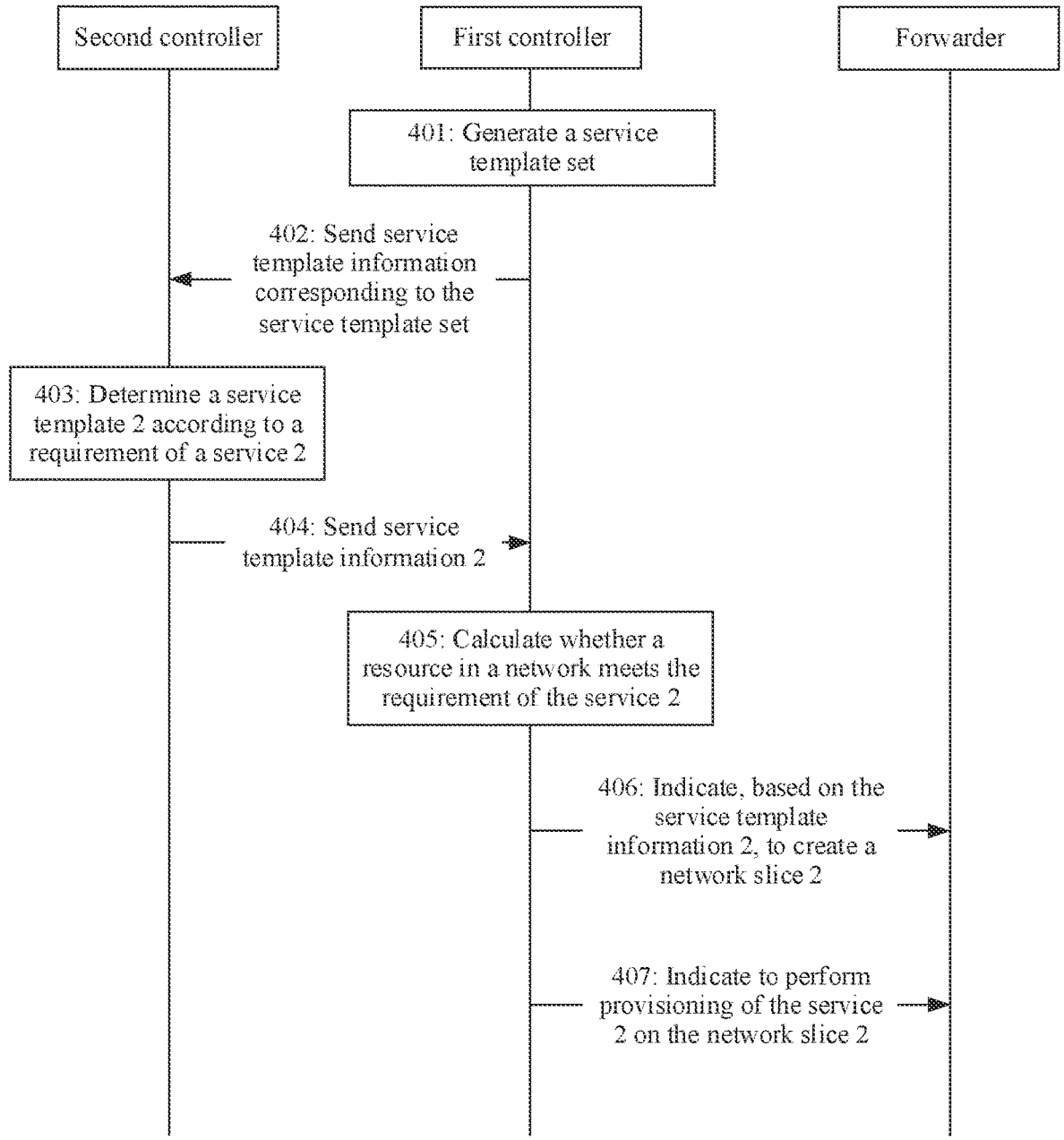
FIG. 4 is a schematic flowchart of a service processing method 400 according to an embodiment of this application.

Refer to FIG. 4. FIG. 4 is a schematic flowchart of a service processing method 400 according to an embodiment of this application. As shown in FIG. 4, the service processing method 400 includes the following steps.

Step 401: A first controller generates a service template set.

Step 402: The first controller sends service template information corresponding to the service template set to a second controller.

Step 403: The second controller determines the service template 2 according to a requirement of a service 2.

Step 404: The second controller sends service template information 2 to the first controller.

Steps 401 to 404 are similar to the foregoing steps 302 to 305. For details, refer to steps 302 to 305. Details are not described herein again.

Step 405: The first controller calculates whether a resource in a network meets the requirement of the service 2.

In this embodiment, after obtaining the service template information 2, the first controller may determine the service template 2 corresponding to the service template information 2, to determine the requirement of the service 2. Because no network slice is created in advance, the first controller may calculate in advance whether the resource in the network can be used to create a network slice that meets the requirement of the service 2.

Step 406: The first controller indicates, based on the service template information 2, the forwarder to create a network slice 2.

When the first controller learns, through calculation, that the resource in the network can be used to create the network slice that meets the requirement of the service 2, the first controller may indicate, based on the determined service template 2, the forwarder to create the corresponding network slice 2, to meet the requirement of the service 2.

It may be understood that, after obtaining a corresponding service template, the first controller indicates the forwarder to create a corresponding network slice, so that the network slice can be created on demand according to an actual service requirement. This makes creation of the network slice more flexibly, and ensures proper utilization of the network resource.

Step 407: The first controller indicates the forwarder to perform provisioning of the service 2 on the network slice 2.

After the forwarder creates the network slice 2, the first controller may indicate, based on the service template 2, the forwarder to perform provisioning of the service 2 on the network slice 2.

In the foregoing embodiments, although an example in which the first controller includes the NSSMF and the second controller includes the NSMF is used to describe the scenario to which the service processing method provided in embodiments of this application is applied. It may be understood that the service processing method provided in embodiments of this application may be further applied to a network scenario in which a controller and a forwarder are deployed. A type of the controller deployed in the network to which embodiments of this application are applied is not uniquely limited herein.

Figure 5:
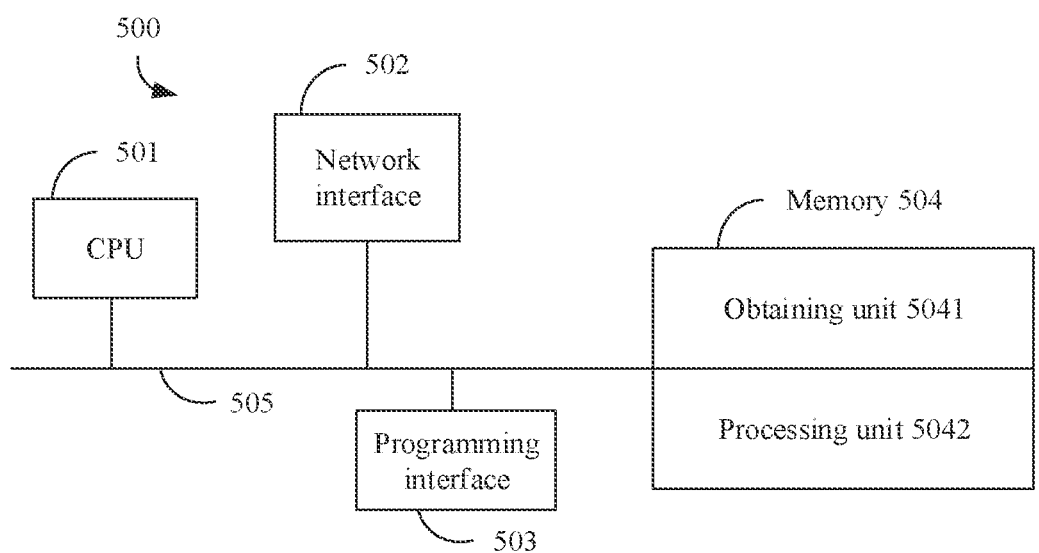
FIG. 5 is a schematic diagram of a structure of a network device 500 according to an embodiment of this application.

To implement the foregoing embodiments, this application further provides a network device. Refer to FIG. 5. FIG. 5 is a schematic diagram of a structure of a network device 500 according to an embodiment of this application.

Although the network device 500 shown in FIG. 5 shows some specific features, a person skilled in the art may be aware from embodiments of this application that, for brevity, FIG. 5 does not show various other features, to avoid confusing more related aspects of the implementations disclosed in embodiments of this application. For this purpose, as an example, in some implementations, the network device 500 includes one or more processing units (cpu) 501, a network interface 502, a programming interface 503, a memory 504, and one or more communications buses 505 that are configured to interconnect various components. In some other implementations, some function components or units may be omitted or added to the network device 500 based on the foregoing example.

In some implementations, in addition to another purpose, the network interface 502 is configured to be connected to one or more other network devices/servers in a network system. In some implementations, the communications bus 505 includes a circuit that interconnects system components and controls communication between the system components. The memory 504 may include a nonvolatile memory, for example, a read-only memory (ROM), a programmable read-only memory (PROM), an erasable programmable read-only memory (EPROM), an electrically erasable programmable read-only memory (EEPROM), or a flash memory. The memory 504 may also include a volatile memory. The volatile memory may be a random access memory (RAM), and is used as an external cache.

In some implementations, a non-transitory computer-readable storage medium of the memory 504 or the memory 504 stores the following programs, modules, and data structures, or a subset thereof, and specifically includes a transceiver unit (not shown in the figure), an obtaining unit 5041, and a processing unit 5042.

In a possible embodiment, the network device 500 may be, for example, the first controller or the second controller in the foregoing embodiment. The network device 500 may include, for example, the transceiver unit, the obtaining unit 5041, and the processing unit 5042. The obtaining unit 5041 is configured to obtain a service template set. The service template set includes one or more service templates, and the one or more service templates are separately used to determine one or more network slices. The transceiver unit is configured to send service template information corresponding to the service template set. The transceiver unit is further configured to receive a first message sent by the second controller. The first message includes first service template information corresponding to a first service template, the first service template belongs to the service template set, and the first service template information is determined by the second controller according to a requirement of a first service. The processing unit 5042 is configured to perform, by the first controller, provisioning of the first service based on the first service template. The first service template is determined based on the first service template information.

Optionally, in a possible implementation, the one or more service templates separately correspond to one or more network slice identifiers, and the one or more network slice identifiers are identifiers of one or more created network slices. The processing unit 5042 is further configured to determine a first network slice based on the first service template. The first network slice is used to perform provisioning of the first service.

Optionally, in a possible implementation, the processing unit 5042 is further configured to: determine the first service template based on the first service template information, and determine the first network slice based on a first network slice identifier corresponding to the first service template.

Optionally, in a possible implementation, the transceiver unit is further configured to send a second message to a forwarder based on the first service template. The second message is used to indicate the forwarder to perform configuration corresponding to the first service on the first network slice.

Optionally, in a possible implementation, the method further includes: The transceiver unit is further configured to receive a fourth message sent by the second controller. The fourth message includes second service template information corresponding to a second service template, the second service template belongs to the service template set, and the second service template is determined by the second controller according to a requirement of a second service. The processing unit 5042 is further configured to determine the first network slice based on the second service template determined based on the second service template information. The first network slice is used to perform provisioning of the second service.

Optionally, in a possible implementation, the transceiver unit is further configured to receive a fourth message sent by the second controller. The fourth message includes second service template information corresponding to a second service template, and the second service template belongs to the service template set, and the second service template is determined by the second controller according to a requirement of a second service. The processing unit 5042 is further configured to determine a second network slice based on the second service template determined based on the second service template information. The transceiver unit is further configured to send a fifth message based on the fact that a source that can be provided by the second network slice does not meet the requirement of the second service. The fifth message is used to indicate that the second network slice is unavailable.

Optionally, in a possible implementation, the transceiver unit is further configured to send a third message to the forwarder based on the first service template. The third message is used to indicate the forwarder to create the first network slice, and the first network slice created by the forwarder is used to perform provisioning of the first service.

Optionally, in a possible implementation, the first service template includes performance information, and the processing unit 5042 is further configured to perform performance monitoring on the first service based on the performance information.

Optionally, in a possible implementation, the first controller includes an NSSMF, and the second controller includes an NSMF.

Optionally, in a possible implementation, the service template includes one or more of a VPN access mode, bearer tunnel information, performance information, and service level agreement SLA information.

In another possible embodiment, the transceiver unit is configured to receive first service template information that is sent by a first controller and that corresponds to a first service template set. The first service template set includes one or more service templates, and the one or more service templates are separately used to determine one or more network slices. The transceiver unit is further configured to send a first message to the first controller. The first message includes first service template information corresponding to a first service template, the first service template belongs to the service template set, and the first service template information is determined by the second controller according to a requirement of a first service.

Optionally, in a possible implementation, the service template information includes one or more service template identifiers respectively corresponding to the one or more service templates, and the first message includes a first service template identifier corresponding to the first service template.

Optionally, in a possible implementation, the network device further includes the obtaining unit 5041 and the processing unit 5042. The obtaining unit 5041 is configured to obtain network topology resource information. The processing unit 5042 is configured to determine, according to the requirement of the first service and the network topology resource information, the first service template information corresponding to the first service template.

Optionally, in a possible implementation, the transceiver unit is further configured to receive third service template information that is sent by a third controller and that corresponds to a third service template.

The processing unit 5042 is further configured to determine, based on the first service template information received from the first controller and the third service template information received from the third controller, the first service template information corresponding to the first service template.

It may be understood that the foregoing function of the transceiver unit may be implemented by a processor by invoking program code in the memory, and the processor may cooperate with the network interface 502 when necessary. Alternatively, a data receiving/sending operation may be completed by the network interface 502 on the network device 500.

In various implementations, the network device 500 is configured to perform the service processing method provided in embodiments of this application, for example, perform the service processing method corresponding to the embodiment shown in FIG. 2, FIG. 3, or FIG. 4.

The foregoing describes embodiments of this application in detail. Steps in the methods in embodiments of this application may be sequentially scheduled, combined, or deleted according to an actual requirement. Modules in the apparatus in embodiments of this application may be divided, combined, or deleted according to an actual requirement.

It should be understood that "one embodiment" or "an embodiment" mentioned in the entire specification does not mean that particular features, structures, or characteristics related to the embodiment are included in at least one embodiment of this application. Therefore, "in one embodiment" or "in an embodiment" appearing in the specification does not refer to a same embodiment. In addition, these particular features, structures, or characteristics may be combined in one or more embodiments in any proper manner. It should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

It should be understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for convenient and brief description, for a detailed working processes of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, unit division is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device/server) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

What is claimed is:

1. A service processing method, comprising:
   obtaining, by a first controller, a service template set, wherein the service template set comprises one or more service templates that separately determine one or more network slices;
   sending, by the first controller, service template information corresponding to the service template set to a second controller;
   receiving, by the first controller, a first message sent by the second controller, wherein the first message comprises first service template information corresponding to a first service template, the first service template belongs to the service template set, and the first service template information is determined by the second controller according to a requirement of a first service; and
   performing, by the first controller, provisioning of the first service based on the first service template, wherein the first service template is determined based on the first service template information.

2. The service processing method according to claim 1, wherein:
the one or more service templates separately correspond to one or more network slice identifiers, the one or more network slice identifiers are identifiers of one or more created network slices; and
the performing, by the first controller, provisioning of the first service based on the first service template comprises:
determining, by the first controller based on the first service template, a first network slice that performs provisioning of the first service.

3. The service processing method according to claim 2, wherein the determining, by the first controller, a first network slice based on the first service template comprises:
determining, by the first controller, the first service template based on the first service template information; and
determining, by the first controller, the first network slice based on a first network slice identifier corresponding to the first service template.

4. The service processing method according to claim 3, wherein after the first controller determines the first network slice based on the first service template determined based on the first service template information, the service processing method further comprises:
sending, by the first controller, a second message to a forwarding device based on the first service template, wherein the second message indicates to the forwarding device to perform configuration corresponding to the first service on the first network slice.

5. The service processing method according to claim 4, wherein the performing, by the first controller, provisioning of the first service based on the first service template comprises:
sending, by the first controller, a third message to the forwarding device based on the first service template, wherein the third message indicates to the forwarding device to create the first network slice that performs provisioning of the first service.

6. The service processing method according to claim 2, wherein the service processing method further comprises:
receiving, by the first controller, a fourth message sent by the second controller, wherein the fourth message comprises second service template information corresponding to a second service template, the second service template belongs to the service template set, and the second service template is determined by the second controller according to a requirement of a second service; and
determining, by the first controller based on the second service template determined based on the second service template information, the first network slice that performs provisioning of the second service.

7. The service processing method according to claim 2, wherein the service processing method further comprises:
receiving, by the first controller, a fourth message sent by the second controller, wherein the fourth message comprises second service template information corresponding to a second service template, the second service template belongs to the service template set, and the second service template is determined by the second controller according to a requirement of a second service;
determining, by the first controller, a second network slice based on the second service template determined based on the second service template information; and sending, by the first controller, a fifth message based on a determination that a resource that can be provided by the second network slice does not meet the requirement of the second service, wherein the fifth message indicates that the second network slice is unavailable.

8. The service processing method according to claim 1, wherein:
the first service template comprises performance information; and
after the performing, by the first controller, provisioning of the first service based on the first service template, the service processing method further comprises:
performing, by the first controller, performance monitoring on the first service based on the performance information.

9. The service processing method according to claim 1, wherein the first controller comprises a network slice subnet management function (NSSMF), and the second controller comprises a network slice management function (NSMF).

10. The service processing method according to claim 1, wherein the service template comprises one or more of a virtual private network (VPN) access mode, bearer tunnel information, performance information, and service level agreement (SLA) information.

11. An apparatus, wherein the apparatus comprises:
at least one processor; and
one or more memories coupled to the at least one processor and storing programming instructions for execution by the at least one processor to:
obtain a service template set, wherein the service template set comprises one or more service templates that separately determine one or more network slices;
send service template information corresponding to the service template set to a second controller;
receive a first message sent by the second controller, wherein the first message comprises first service template information corresponding to a first service template, the first service template belongs to the service template set, and the first service template information is determined by the second controller according to a requirement of a first service; and
perform provisioning of the first service based on the first service template, wherein the first service template is determined based on the first service template information.

12. The apparatus according to claim 11, wherein:
the one or more service templates separately correspond to one or more network slice identifiers, the one or more network slice identifiers are identifiers of one or more created network slices; and
perform the provisioning of the first service based on the first service template comprises:
determine, based on the first service template, a first network slice that performs provisioning of the first service.

13. The apparatus according to claim 12, wherein the one or more memories store the programming instructions for execution by the at least one processor to:
determine the first service template based on the first service template information; and
determine the first network slice based on a first network slice identifier corresponding to the first service template.

14. The apparatus according to claim 13, wherein the one or more memories store the programming instructions for execution by the at least one processor to:

send a second message to a forwarding device based on the first service template, wherein the second message indicates to the forwarding device to perform configuration corresponding to the first service on the first network slice.

15. The apparatus according to claim 14, wherein the one or more memories store the programming instructions for execution by the at least one processor to:

send a third message to the forwarding device based on the first service template, wherein the third message indicates to the forwarding device to create the first network slice that performs provisioning of the first service.

16. A non-transitory computer readable storage medium storing a program for execution by at least one processor to perform operations comprising:

obtaining a service template set, wherein the service template set comprises one or more service templates that separately determine one or more network slices;

sending service template information corresponding to the service template set to a second controller;

receiving a first message sent by the second controller, wherein the first message comprises first service template information corresponding to a first service template, the first service template belongs to the service template set, and the first service template information is determined by the second controller according to a requirement of a first service; and performing provisioning of the first service based on the first service template, wherein the first service template is determined based on the first service template information.

17. The non-transitory computer readable storage medium according to claim 16, wherein:

the one or more service templates separately correspond to one or more network slice identifiers, the one or more network slice identifiers are identifiers of one or more created network slices; and performing the provisioning of the first service based on the first service template comprises:

determining, based on the first service template, a first network slice that performs provisioning of the first service.

18. The non-transitory computer readable storage medium according to claim 17, wherein the operations further comprise:

determining the first service template based on the first service template information; and determining the first network slice based on a first network slice identifier corresponding to the first service template.

19. The non-transitory computer readable storage medium according to claim 18, wherein the operations further comprise:

sending a second message to a forwarding device based on the first service template, wherein the second message indicates to the forwarding device to perform configuration corresponding to the first service on the first network slice.

20. The non-transitory computer readable storage medium according to claim 19, wherein the operations further comprise:

sending a third message to the forwarding device based on the first service template, wherein the third message indicates to the forwarding device to create the first network slice that performs provisioning of the first service.

\* \* \* \* \*